United States Patent [19]

Haas et al.

[11] 4,053,575

[45] Oct. 11, 1977

[54] SULFUR RECOVERY FROM $H_2S$ AND $SO_2$-CONTAINING GASES

[75] Inventors: Larry A. Haas, Burnsville; Sanaa E. Khalafalla, Minneapolis, both of Minn.

[73] Assignee: The United States of America as represented by the Secretary of the Interior, Washington, D.C.

[21] Appl. No.: 667,060

[22] Filed: Mar. 15, 1976

Related U.S. Application Data

[63] Continuation-in-part of Ser. No. 498,790, Aug. 19, 1974, abandoned.

[51] Int. Cl.² ............................................. C01B 17/04
[52] U.S. Cl. .................................................. 423/575
[58] Field of Search ................ 423/222, 226, 575, 576

[56] References Cited

U.S. PATENT DOCUMENTS

| | | | |
|---|---|---|---|
| 1,773,293 | 8/1930 | Benner et al. | 423/576 |
| 3,149,920 | 9/1964 | Urban | 423/576 X |
| 3,170,766 | 2/1965 | Townsend | 423/575 |
| 3,598,529 | 8/1971 | Deschamps | 423/575 X |

*Primary Examiner*—G. O. Peters
*Attorney, Agent, or Firm*—William S. Brown; Donald A. Gardiner

[57] ABSTRACT

Sulfur is recovered from gases containing $H_2S$ and $SO_2$ by absorption of the $H_2S$ and $SO_2$ in a glycol absorbent, and reaction of the $H_2S$ and $SO_2$ in solution in the absorbent in the presence of a solid catalyst.

1 Claim, No Drawings

SULFUR RECOVERY FROM H₂S AND SO₂-CONTAINING GASES

This application is a continuation-in-part of application Ser. No. 498,790, filed Aug. 19, 1974, now abandoned.

Greater environmental concern and the enactment of stringent air pollution legislation have made it necessary to develop efficient and economical processes for removing pollutants, particularly those comprising the sulfur-containing gases, e.g. hydrogen sulfide and sulfur dioxide. The economics of gas purification are improved by processes which result in the recovery of a salable by-product such as sulfur. A number of processes have been developed for recovering sulfur from gases containing hydrogen sulfide and/or sulfur dioxide. A typical process involves the reaction according to the following equation:

$$2H_2S + SO_2 \rightarrow 3S + 2H_2O \qquad (I)$$

While the known processes utilizing this reaction are generally suitable for removal and recovery of sulfur from sulfurous gases, a number of disadvantages are present and there exists a need for improvements, particularly in the efficiency of the process.

Among the prior art methods for recovery of sulfur from hydrogen sulfide and/or sulfur dioxide-containing gases by the reaction of equation (I) is the Claus process. In this process, a sour gas mixture is treated by Girbotol process, wherein an aqueous solution of mono-, di-, or tri-ethanolamine reacts with the hydrogen sulfide and carbon dioxide components of the gas mixture and effects their removal. These acid gases are then released from the amine solution by heat. One-third of this acid gas mixture is separated and oxidized to form the proper amount of sulfur dioxide to enter into the reaction in the equation above. The remaining hydrogen sulfide and this sulfur dioxide are then combined and the reaction between them is catalyzed by their passage through a bed of bauxite. The reaction temperature during passage through the catalyst is sufficiently high that the sulfur formed by the reaction remains in vapor form. The sulfur vapors are then condensed, recovered, and stored in liquid or solid state. While this process seems attractive from a theoretical standpoint, it has many undesirable features as a commerical process. For example, the amine absorption process for removing hydrogen sulfide from the feed gas requires a relatively high capital investment and entails high maintenance costs due to corrosion, particularly where carbon dioxide is present in the feed gas in appreciable percentages and is absorbed by the amine solutions along with the hydrogen sulfide and liberated as carbonic acid.

U.S. Pat. Nos. 2,881,047 and 3,170,766 to Townsend disclose another process for the recovery of sulfur by reaction of SO₂ and H₂S according to the above reaction. In this process, sour gas, meaning any gaseous mixture containing hydrogen sulfide, is sweetened by flowing it in intimate contact with a solution of sulfur dioxide in a concentrated aqueous solution of a neutral, inert, stable organic solvent having a relatively low vapor pressure and being substantially miscible with water. Suitable solvents include glycols. The solution of the organic solvent acts both as a catalyst and as a medium for the reaction between hydrogen sulfide and sulfur dioxide.

Another method for recovering sulfur involving the reaction in equation (I) is disclosed in U.S. Pat. No. 2,994,558. In the process of this patent, liquid sulfur is used as an absorbent for hydrogen sulfide, a reaction coolant, and as a sulfur recovering agent. The process depends on the fact that the solubility of hydrogen sulfide in liquid sulfur behaves abnormally from other gases in liquids, particularly with respect to temperature effects on gas solubility. Specifically, it was found that hydrogen sulfide gas under pressure is quite soluble in liquid sulfur at a temperature of 300° F., and that the solubility increases with temperature up to about 400° F and then remains substantially constant between 400° and 700° F. Essentially, the process involves absorbing the hydrogen sulfide from a hydrogen sulfide-containing gas in molten sulfur and reacting the absorbed hydrogen sulfide with sulfur dioxide, for example in accordance with equation (I), to form sulfur and water, which is removed as steam. To take advantage of the maximum solubility of the hydrogen sulfide, the process is conducted at sulfur temperatures of 400°-700° F.

U.S. Pat. No. 3,149,920 discloses a further method for recovering sulfur via the reaction of equation (I). In the process of this patent, H₂S and SO₂ are reacted in the presence of a solid catalyst, whereby sulfur and water are deposited in the catalyst bed. A hydrocarbon solvent is then employed to regenerate the catalyst by dissolving the sulfur and azeotroping the water from the catalyst bed.

Applicants have now found, according to the process of the invention, that removal of H₂S and SO₂ and recovery of sulfur from gases containing H₂S and SO₂, may be accomplished rapidly and efficiently by absorbing the H₂S and SO₂ in an organic liquid of the type described below, and reacting the H₂S and SO₂, in solution in the absorbent, in contact with a solid catalyst. This process has been found to provide nearly complete conversions, i.e., about 98% or greater, of the H₂S and SO₂ to sulfur and water, thus resulting in very efficient regeneration of the absorbent, even at moderate temperatures. In addition, the process enables convenient initial separation of the H₂S and SO₂ from undesired constituents of feed gases such as carbon dioxide, oxygen and nitrogen.

The feed gas, or gases, containing the H₂S and SO₂ will generally consist of waste gases from a wide variety of sources, e.g., power plants, ore processing plants, refineries, paper mills, sulfuric acid plants, etc. Such gases may contain either H₂S or SO₂, or a mixture of the two in varying proportions. In addition, they may contain varying amounts of other gases such as oxygen, carbon dioxide and nitrogen. The essential objective of the process of the invention is the efficient separation of the H₂S and SO₂ from the other constituents of the waste gases, and reaction of the H₂S and SO₂, according to the process of equation (I), to recover sulfur.

Separation of the H₂S and SO₂ from other waste gas constituents is achieved by absorption of the H₂S and SO₂ in an organic liquid that is a selective absorbent for the H₂S and SO₂, while being a non-absorbent, or poor absorbent, for non-polar gases such as oxygen, carbon dioxide and nitrogen. The organic liquid absorbent must be inert, neutral, stable at the process temperatures, and should have no adverse effect on the activity of the solid catalyst. Furthermore, it should be substantially immiscible with liquid sulfur, to facilitate subsequent removal of sulfur from the reaction zone. It has been found that these requirements are met by low molecular weight glycols such as ethylene glycol, diethylene glycol, triethylene glycol and propylene glycol. In particular, ethylene glycol has been found to give very good results in the invention, as well as being readily available and economical. In addition to serving as a selective absorbent, the glycol also exerts some catalytic effect in the $H_2S$-$SO_2$ reaction of equation (I).

The solid catalyst employed in the process of the invention consists essentially of alumina, i.e., alumina is the active ingredient of the catalyst. For maximum catalytic effect a high surface area alumina, such as gamma alumina, is generally preferred. However, other forms of alumina or alumina-containing materials, such as bauxite or Berbece ore, generally provide sufficient catalytic activity and, in addition, offer an economic advantage over the pure alumina materials. Berbece ore, e.g., consisting principally of about 63% alumina, 3% iron oxide, 2% silica and 10% water of hydration, provides a desirable combination of catalytic activity and economy.

Optimum amounts and physical characteristics of the solid catalyst will vary considerably depending on the specific type of catalyst employed, the specific absorbent, proportions of $H_2S$ and $SO_2$ reactants, reaction temperature, etc., and are best determined empirically. However, an amount of catalyst of about 35 to 75 weight percent of the solid/liquid mixture will generally give good results. The catalyst will generally be most efficient when employed in a relatively small particle size, e.g., about 0.8 to 1.0 mm, and pore size, e.g., about 0.001 to 0.1$\mu$.

Absorption of the $H_2S$ and $SO_2$ in the liquid absorbent, and reaction of the $H_2S$ and $SO_2$ in solution in the absorbent, may take place either simultaneously or as separate steps. Where the two processes are conducted simultaneously, the liquid absorbent and solid catalyst are initially combined in a suitable reaction vessel. The reaction vessel may be any conventional catalytic reactor that provides adequate contact between the $H_2S$ and $SO_2$-containing gas, or gases, and the liquid absorbent, and between the liquid absorbent solution of $H_2S$ and $SO_2$ and the solid catalyst. Such reactors include fixed solid/liquid bed reactors, stirred batch reactors in which the solid catalyst is suspended in the liquid medium, reactors in which the fluid is passed over the fixed bed solid catalyst, reactors employing a fluid bed or moving bed of the solid catalyst, etc.

Where absorption and reaction of $H_2S$ and $SO_2$ are separate, the feed gas is initially fed to an absorber, e.g., a conventional counter-current unit, in which $H_2S$ and $SO_2$ are selectively absorbed. The loaded absorbent is then pumped to the catalytic reactor.

Proportions of $H_2S$ and $SO_2$ in solution in the liquid absorbent are not critical, although stoichiometric quantities of the reactants, i.e., a ratio of $H_2S$ to $SO_2$ of about 2 to 1, will generally be preferred to avoid a substantial residue of either $H_2S$ or $SO_2$ in the liquid absorbent. Concentrations of $H_2S$ and $SO_2$ sufficient to substantially saturate the absorbent may be used; however, it is generally preferable to limit the concentration to about 5 percent to avoid incomplete absorption. If the feed gas or the loaded liquid absorbent contains only $H_2S$ or $SO_2$, or contains less than the stoichiometric amount of either, the relative amounts are adjusted, prior to reaction, by addition of the appropriate amount of the deficient gas. This may be accomplished by any conventional means for addition of the deficient gas to the feed gas prior to absorption, or to the absorbent prior to reaction.

Reaction temperature, i.e., the operating temperature in the catalytic reactor may vary over a wide range, i.e., from about room temperature to several hundred degrees C. However, it is generally advantageous to conduct the reaction above the melting point of sulfur since the sulfur product is then readily recovered as a dense liquid that settles to the bottom of the reactor. Accordingly, temperatures in the range of about 120° to 170° C are generally preferred. In addition, water formed in the reaction is conveniently removed, usually at the top of the reactor, in the form of steam.

The invention will be further illustrated by the following examples.

EXAMPLE 1

This example illustrates the catalytic activity of the liquid absorbent alone in the reaction of $H_2S$ and $SO_2$.

A test tube (0.6 inch I.D.) was filled with 29.5 cm$^3$ of ethylene glycol. A feed gas containing 3 percent $H_2S$, 1.5 percent $SO_2$, and the balance He, was bubbled through the solution, at a rate of 230 cm$^3$/min, by immersing at 0.25 inch O.D. pyrex tube into the bottom of the test tube. The operating temperatures were 136 and 150° C, and the reaction was continued for about 1 hour. Results are summarized below in Table 1 under Test 1A and 1B and show that only 60% of the $SO_2$ or $H_2S$ was converted to sulfur and water.

EXAMPLE 2

This example illustrates the efficiency of a solid catalyst compared to the liquid of Example 1.

The ethylene glycol used in Example 1 was replaced by 29.5 cm$^3$ (or 20 grams) of 20 mesh Berbece ore. The feed gas flow rate was 295 cm$^3$/min and the reaction was again continued for about 1 hour. The results, summarized as Tests 2A and 2B in Table 1, indicate that the solid Berbece ore is a better catalyst than an equal amount of ethylene glycol.

EXAMPLE 3

This example illustrates the efficiency of the combination of liquid absorbent and solid catalyst.

Example 2 was repeated except that just enough ethylene glycol (6.9 cm$^3$) was added to cover the Berbece ore. Results in Table 1 (Tests 3A and 3B) indicate that the ethylene glycol did not effect the solid catalyst activity, as more than 98% conversion was obtained.

EXAMPLE 4

This example illustrates the lack of criticality of the proportions the liquid absorbent and solid catalyst.

The same solid catalyst as that of Examples 2 and 3 was used, only 29.5 cm$^3$ of ethylene glycol was added rather than the 6.9 cm$^3$ of Example 3. The results, summarized in Tests 4A and 4B of Table 1 indicate that $H_2S$ or $SO_2$ conversion again was more than 98%.

TABLE 1

| Test No. | Catalyst volume, cm³ Berbece, $V_s$ | Ethylene glycol, $V_l$ | $V_s + V_l$ | %(w/w) Liquid | Temp. °C. | Flow (F) cm³/min. | Residence time ($V_s/F$), min. | $H_2S$ or $SO_2$ Conversion % |
|---|---|---|---|---|---|---|---|---|
| 1A | 0 | 29.5 | 29.5 | 100 | 136 | 230 | — | 60 |
| 1B | 0 | 29.5 | 29.5 | 100 | 150 | 230 | — | 60 |
| 2A | 29.5 | 0 | 29.5 | 0 | 170 | 295 | 0.100 | >98 |
| 2B | 29.5 | 0 | 29.5 | 0 | 147 | 295 | 0.100 | >98 |
| 3A | 29.5 | 6.9 | 36.4 | 27.5 | 146 | 224 | 0.132 | >98 |
| 3B | 29.5 | 6.9 | 36.4 | 27.5 | 140 | 380 | 0.078 | >98 |
| 4A | 29.5 | 29.5 | 59.0 | 62.5 | 144 | 320 | 0.092 | >98 |
| 4B | 29.5 | 29.5 | 59.0 | 62.5 | 152 | 540 | 0.055 | >98 |

We claim:

1. A process for recovery of sulfur comprising the steps of (1) loading of an absorbent selected from the group consisting of ethylene glycol, diethylene glycol, triethylene glycol, and propylene glycol with a mixture of hydrogen sulfide and sulfur dioxide by absorbing hydrogen sulfide, sulfur dioxide, or mixtures thereof from waste gases that additionally contain carbon dioxide, oxygen or nitrogen and (2) reacting the hydrogen sulfide and sulfur dioxide, in solution in the absorbent, in contact with a solid catalyst, the active ingredient of which is alumina.

* * * * *